United States Patent
Tateishi et al.

(10) Patent No.: US 8,138,746 B2
(45) Date of Patent: Mar. 20, 2012

(54) PHYSICAL PROPERTIES DETECTION DEVICE AND PHYSICAL PROPERTIES DETECTION METHOD

(75) Inventors: Kiyoshi Tateishi, Hannou (JP); Takanori Maeda, Kawagoe (JP); Hideki Kobayashi, Kawagoe (JP); Tomotaka Yabe, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 274 days.

(21) Appl. No.: 12/532,129

(22) PCT Filed: Mar. 20, 2007

(86) PCT No.: PCT/JP2007/055688
§ 371 (c)(1),
(2), (4) Date: Sep. 18, 2009

(87) PCT Pub. No.: WO2008/114421
PCT Pub. Date: Sep. 25, 2008

(65) Prior Publication Data
US 2010/0033159 A1    Feb. 11, 2010

(51) Int. Cl.
*G01N 27/00* (2006.01)
(52) U.S. Cl. .................. 324/71.1; 324/255; 324/311
(58) Field of Classification Search .................. None
See application file for complete search history.

(56) References Cited

U.S. PATENT DOCUMENTS

| 6,345,018 B1 | 2/2002 | Maegawa et al. |
| 7,750,634 B1 * | 7/2010 | Christensen ............... 324/309 |
| 7,931,867 B2 * | 4/2011 | Korlach .................. 422/82.08 |
| 2004/0076047 A1 | 4/2004 | Cho et al. |

FOREIGN PATENT DOCUMENTS

| JP | 05-007132 A | 1/1993 |
| JP | 05268078 A | 10/1993 |
| JP | 2000090593 A | 3/2000 |
| JP | 2001-052446 A | 2/2001 |
| JP | 2001292184 A | 10/2001 |
| JP | 2004-127489 A | 4/2004 |

(Continued)

OTHER PUBLICATIONS

Hideo Tsunoda, Basics and Application of PLL, Tokyo Denki University Press, 1978, pp. 85-87.

(Continued)

*Primary Examiner* — Jermele M Hollington
*Assistant Examiner* — Trung Nguyen
(74) *Attorney, Agent, or Firm* — Sughrue Mion, PLLC

(57) ABSTRACT

A physical properties detection device comprising a probe to be placed near or touching a surface of a ferroelectric; an oscillation loop including the probe and capacitance within the ferroelectric; and detection means for detecting a physical properties of the ferroelectric on the basis of a frequency variation of a measurement signal generated in the oscillation loop, the frequency variation accompanying application of an alternating electric field to the ferroelectric; and the physical properties detection device is further comprising frequency conversion means for converting the frequency of the measurement signal to a low frequency and outputting the resulting signal as a converted measurement signal; frequency control means for controlling the frequency of the converted measurement signal so as to match a target frequency; frequency detection means for generating a frequency detection signal that has a signal level corresponding to the frequency of the converted measurement signal; and synchronous detection means for synchronously detecting the frequency detection signal on the basis of a synchronization signal.

14 Claims, 10 Drawing Sheets

FOREIGN PATENT DOCUMENTS

WO 2006/106924 A1 10/2006

OTHER PUBLICATIONS

Japanese Patent Office Action dated Sep. 16, 2011 and English-language translation thereof.

NHK TV Textbook of Technology (vol. 1), NHK Publishing, 1989, pp. 121-131.

Shin-ichi Hyodo, Methods of Scientific Experiments, revised edition, The Society of the Promotion for the Open University of Japan, 1997, pp. 180-194.

* cited by examiner

PHYSICAL PROPERTIES DETECTION DEVICE AND PHYSICAL PROPERTIES DETECTION METHOD

TECHNICAL FIELD

The present invention relates to a physical properties detection device and physical properties detection method for detecting a physical properties that accompanies a capacitance variation, such as the polarization direction of a ferroelectric material.

BACKGROUND ART

Recent increases in information volume have led to an increased need for techniques for storing information at high speed and capacity. The recording density of magnetic storage, the most widely used form of information recording, is currently approaching the theoretical limit, and a recording density of 1 Tbit/inch$^2$ is considered to be the limit even when perpendicular magnetic recording is used. On the other hand, ferroelectrics have spontaneous polarization, and the polarization direction thereof can be reversed by applying an electric field from the outside. Consequently, digital data can be correlated to the orientation of this polarization in order to record information. It is widely known that the domain walls of a ferroelectric are only one to two lattice units wide and are markedly thinner than those of a ferromagnet, and because the domain size of a ferroelectric is also much smaller than the domain size of a ferromagnet, the ability to artificially control the extremely minute domains of a ferroelectric would make it possible to obtain an information recording element having extremely high density. However, the polarization in a ferroelectric material is masked by electrons, ions, and other surface charges adhering to the surface of the material, the polarization has been difficult to measure; i.e., recorded information has been difficult to read.

An SNDM (scanning nonlinear dielectric microscope) is known as a device for detecting the polarization distribution of a ferroelectric by a purely electrical method. FIG. 1 is a block diagram showing a publicly known device for detecting the polarization direction of a ferroelectric using an SNDM. This device determines the polarization direction of a ferroelectric by measuring the nonlinear permittivity of a ferroelectric material, i.e., the capacitance Cp directly below the probe 3. In this device, in order to detect the polarization direction of the ferroelectric material 1, an alternating electric field is applied from the outside between a stage 2 and a ring probe 4 and probe 3. The oscillation frequency of an oscillator 5 is then varied in accordance with the alternating electric field. Since the ratio of variation of oscillation frequency, which includes the polarity, at this time is determined by the nonlinear permittivity, i.e., the capacitance Cp directly below the probe, the polarization distribution of the ferroelectric material is detected by two-dimensional scanning of the ratio of the frequency variation by the probe 3. Specifically, after the frequency variation of the oscillator 5 is demodulated by an FM demodulator 6, the polarization distribution is detected by synchronous detection at the frequency of the applied electric field by a lock-in amplifier 7.

Patent Document 1: Japanese Laid-open Patent Publication No. 2004-127489

DISCLOSURE OF THE INVENTION

Technical Problems

When the probe 3 scans over the ferroelectric material to detect the polarization distribution, such as in the conventional detection device described above, the capacitance Cp directly below the probe 3 varies significantly according to the detection position on the medium, i.e., the data reproduction position, and the oscillation frequency of the oscillator 5 therefore also varies accordingly. Since the FM demodulator 6 also directly receives this frequency signal and demodulates the signal, the range of detected frequencies that can be demodulated must be wide, and signals are difficult to detect with high sensitivity. The variation of the oscillation frequency that accompanies application of the alternating electric field is slight, and this variation must be accurately detected. This point can stand improvements. When a lock-in amplifier is used in signal detection, such as in the conventional detection device described above, the circuit becomes large in scale. Therefore, it is difficult to record and reproduce data simultaneously using the plurality of probes mounted in the device.

The present invention was developed in view of the foregoing problems, and an object of the present invention is to provide a physical properties detection device that can be composed of a small-scale circuit, and that can precisely detect the physical properties (polarization state) of a medium that accompanies a change in the nonlinear permittivity, such as in a ferroelectric, and to provide a physical properties detection method.

Solution to Problems

The physical properties detection device of the present invention is a physical properties detection device comprising a probe to be placed near or touching a surface of a ferroelectric; an oscillation loop including the probe and capacitance within the ferroelectric; and detection means for detecting a physical properties of the ferroelectric on the basis of a frequency variation of a measurement signal generated in the oscillation loop, the frequency variation accompanying application of an alternating electric field to the ferroelectric; and the physical properties detection device is further comprising frequency conversion means for converting the frequency of the measurement signal to a low frequency and outputting the resulting signal as a converted measurement signal; frequency control means for controlling the frequency of the converted measurement signal so as to match a target frequency; frequency detection means for generating a frequency detection signal that has a signal level corresponding to the frequency of the converted measurement signal; and synchronous detection means for synchronously detecting the frequency detection signal on the basis of a synchronization signal.

The physical properties detection method of the present invention is a physical properties detection method for detecting the physical properties of a ferroelectric on the basis of a frequency variation of a measurement signal generated within an oscillation loop including capacitance within the ferroelectric, and a probe to be placed near or touching a surface of the ferroelectric, the frequency variation accompanying application of an alternating electric field to the ferroelectric; and the physical properties detection method is comprising a frequency conversion step of converting the frequency of the measurement signal to a low frequency and obtaining a converted measurement signal; a frequency detection step of obtaining a frequency detection signal that has a signal level corresponding to the frequency of the converted measurement signal; and a synchronous detection step of synchronously detecting the frequency detection signal on the basis of a synchronization signal; wherein the frequency conversion step includes a frequency control step of controlling the frequency of the converted measurement signal so as to match a target frequency.

Figure 1:
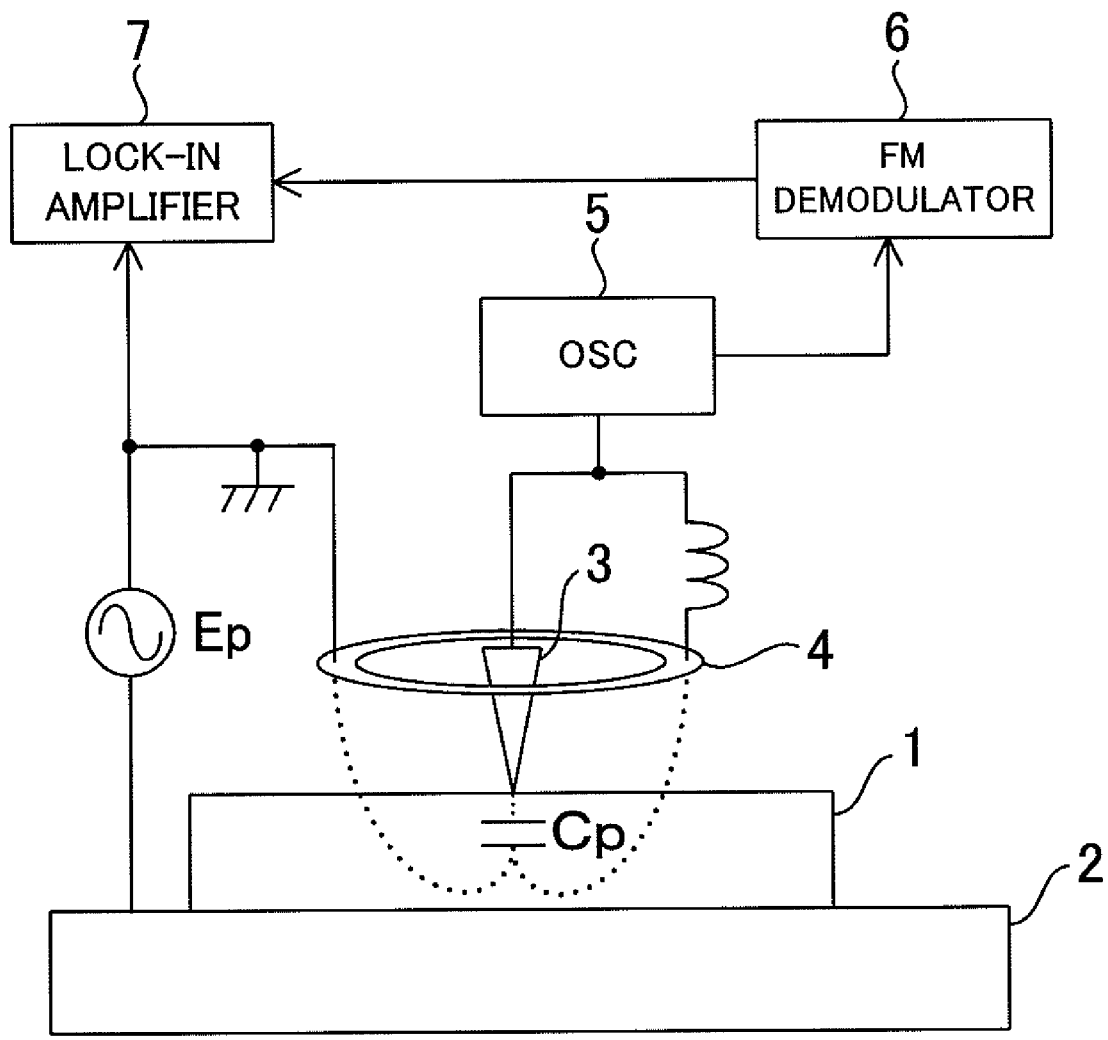
FIG. 1 is a block diagram showing the structure of a conventional detection device.

REFERENCE SIGNS LIST 10 recording medium
11 probe
12 ring probe
13 oscillator
20 mixer
30 frequency detector
40 controller
50 voltage-controlled oscillator
60 search signal generator
70 synchronous detector
80 recording pulse generator
90 changeover switch
100 frequency separator

BEST MODE FOR CARRYING OUT THE INVENTION

Embodiments of the present invention are described below with reference to the accompanying drawings. In the following description, the physical properties detection device of the present invention will be described using an example of a case in which the physical properties detection device is applied in a reproduction device or recording/reproduction device in which a ferroelectric material is used as a recording medium. The same reference numbers are used to refer to constituent elements and parts that are essentially the same or equivalent in each of the drawings described below.

First Embodiment

Figure 2:
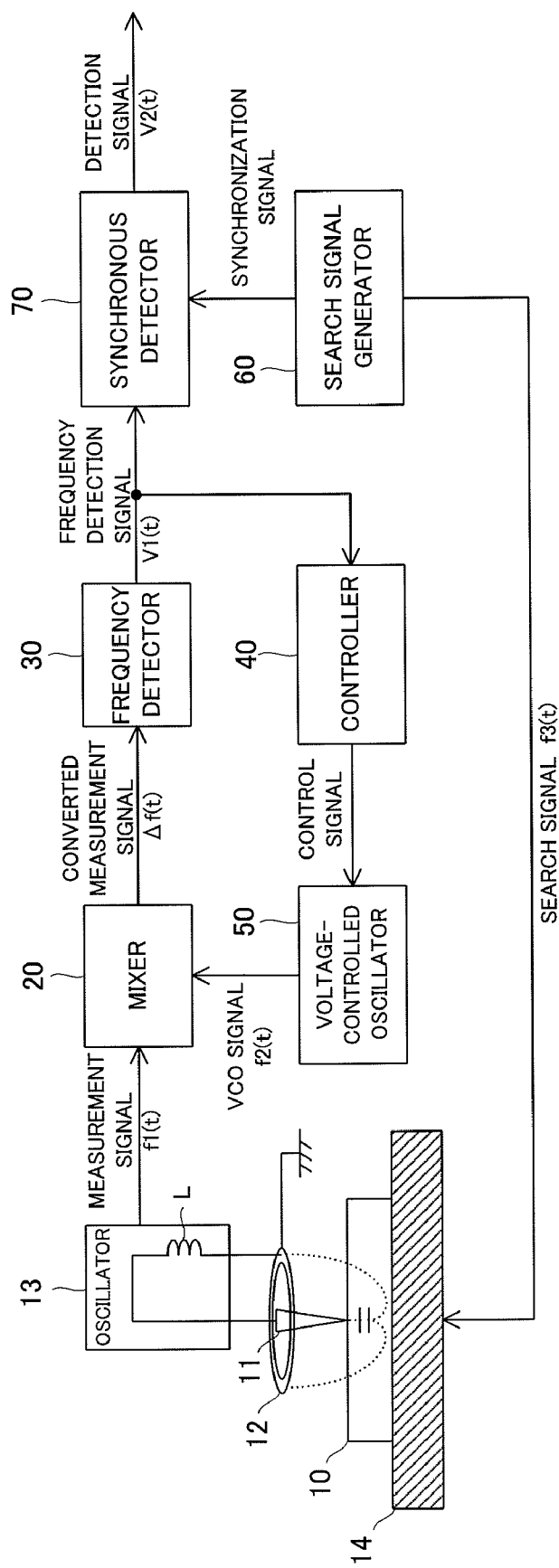
FIG. 2 is a block diagram showing the overall structure of the physical properties detection device as an embodiment of the present invention.

FIG. 2 is a block diagram showing the physical properties detection device as an embodiment of the present invention. The overall structure of the physical properties detection device will be described with reference to FIG. 2.

While a search signal generator 60 generates a search signal f3($t$), applies the search signal f3($t$) to a recording medium 10 via a metal stage 14, the search signal generator 60 generates a synchronization signal, and feeds the synchronization signal to a synchronous detector 70. The recording medium 10 is the measurement subject of the physical properties detection device of the present invention, and is formed from a ferroelectric material. A probe 11 is positioned so that the distal end thereof is near or touching the recording medium 10, and a variation of the capacitance Cp directly below the probe 11 that accompanies application of the search signal f3($t$) is read by the probe 11 and a ring probe 12, and data recorded in the recording medium 10 is thereby read. The position of the probe 11 and the recording medium 10 relative to each other is moved by rotating the recording medium 10 when the recording medium 10 is disk shaped, for example, and when the recording medium 10 is rectangular, the relative position is moved by linearly moving any one of the probe 11 and recording medium 10.

An oscillator 13 includes an inductor L, the inductor L and the capacitance Cp constitute an LC resonant circuit, and the oscillator 13 generates a measurement signal f1($t$) that is frequency-modulated by variation of the capacitance Cp.

A mixer 20 corresponds to the frequency conversion means of the present invention for converting the measurement signal f1($t$) fed from the oscillator 13 to a low frequency, and the mixer 20 generates a converted measurement signal $\Delta f(t)$ that indicates the frequency difference between the measurement signal f1($t$) and a VCO signal f2($t$) that is fed from a voltage-controlled oscillator 50.

A frequency detector 30 corresponds to the frequency detection means of the present invention, and the frequency detector 30 generates a frequency detection signal V1($t$) having a signal level corresponding with the converted measurement signal $\Delta f(t)$, and outputs the frequency detection signal V1($t$) to a controller 40 and a synchronous detector 70.

The controller 40 corresponds to the frequency control means of the present invention, and the controller 40 controls the oscillation frequency of the voltage-controlled oscillator 50 so that the converted measurement signal $\Delta f(t)$ matches a target voltage. Specifically, the controller 40 compares the frequency detection signal V1($t$) with the signal level of a target frequency signal fr that indicates the target value of the converted measurement signal $\Delta f(t)$, and the controller 40 integrates the difference and generates a control signal to cause the converted measurement signal $\Delta f(t)$ to conform to the target frequency.

The voltage-controlled oscillator 50 functions as a so-called local oscillator in the frequency conversion processing performed by the mixer 20. The voltage-controlled oscillator 50 generates a VCO signal f2($t$) (local oscillation signal) that is frequency-controlled in accordance with the control signal fed from the controller 40, and feeds the VCO signal f2($t$) to the mixer 20. A frequency control loop is formed by the mixer 20, frequency detector 30, controller 40, and voltage-controlled oscillator 50 described above.

The synchronous detector 70 corresponds to the synchronous detection means of the present invention, and the synchronous detector 70 synchronously detects the frequency detection signal V1(*t*) fed from the frequency detector 30, in synchrony with the synchronization signal fed from the search signal generator 60, and outputs the result as a detection signal V2(*t*). The detection signal V2(*t*) is a signal indicating the polarization state of the recording medium 10, obtained by applying the search signal f3(*t*) to the recording medium 10, and is specifically a reproduced signal of the recorded data.

A frequency control system is thus formed by the mixer 20, frequency detector 30, controller 40, and voltage-controlled oscillator 50 in the physical properties detection device of the present invention, and a signal detection system is formed by the search signal generator 60 and synchronous detector 70.

The constituent components of the physical properties detection device of the present invention described above will next be described in detail. First, the recording medium 10 that is the measurement subject of the physical properties detection device of the present invention is composed of $LiTaO_3$ or another ferroelectric material, for example, and the polarization direction thereof can be changed by applying an electric field stronger than the coercive field thereof. Consequently, data can be recorded in the recording medium 10 by setting the polarization direction so as to correspond to data. The physical properties detection device of the present invention detects the polarization state, i.e., reproduce the data, of the recording medium 10.

The probe 11 is positioned so that the distal end thereof is near or touching the recording medium 10, and a ring-shaped ring probe 12 is provided on the periphery of the probe 11. The ring probe 12 is fixed at the ground potential. The oscillator 13 includes an inductor L provided between the probe 11 and the ring probe 12, and outputs a measurement signal f1(*t*) that oscillates at an oscillation frequency that is determined by the inductor L and an capacitance Cp that is formed within the recording medium 10 directly below the probe 11.

The search signal f3(*t*) is applied to the recording medium 10 via a metal stage 14, and an alternating electric field is thereby applied. When the alternating electric field is applied to the recording medium 10, an electric field path is formed that leads from the distal end of the probe 11, through the recording medium 10, and to the ring probe 12, and the probe 11 is connected to the capacitance Cp formed inside the recording medium 10. The nonlinear permittivity of the recording medium 10 is also varied by the application of the alternating electric field to the recording medium 10, and the capacitance Cp also varies accordingly. The situation of the capacitance Cp differs according to the polarization state of the recording medium 10. Specifically, the magnitude relation between Cpp and Cpn differs according to the polarization state of the recording medium 10, wherein Cpp is the electrostatic capacitor when the search signal f3(*t*) has a positive polarity, and Cpn is the electrostatic capacitor when the search signal f3(*t*) has a negative polarity. In other words, a change in the capacitance Cp in conjunction with a change in the polarity of the search signal f3(*t*), which the capacitance Cp increase or decrease, responds in exactly inverse depending on the polarization direction of the recording medium 10. The physical properties detection device of the present invention detects the polarization direction of the recording medium 10, i.e., reproduces the data recorded in the recording medium 10, by detecting the state of variation of the capacitance Cp that is based on application of the search signal f3(*t*).

The amount of variation of the capacitance Cp that accompanies application of the search signal f3(*t*) is on the aF (attofarad: $10^{-18}$ F) order, and an extremely small capacitance variation is detected.

The oscillator 13 constitutes a resonant circuit formed by the inductor L and the capacitance Cp. The variation of the capacitance Cp is converted to a frequency and outputted as the measurement signal f1(*t*). Specifically, the oscillation frequency of the measurement signal f1(*t*) decreases when the value of the capacitance Cp is increased by application of the alternating electric field, and the oscillation frequency of the measurement signal f1(*t*) increases when the value of the capacitance Cp decreases. The measurement signal f1(*t*) generated by the oscillator 13 is fed to the mixer 20.

Figure 3:
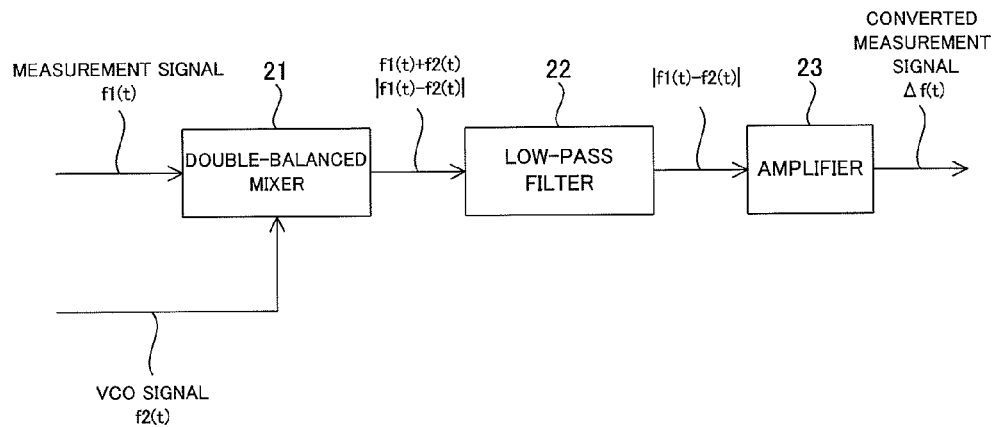
FIG. 3 is a block diagram showing the structure of the mixer as an embodiment of the present invention.

FIG. 3 is a block diagram showing the structure of the mixer 20 in more detail. The mixer 20 is composed of a double-balanced mixer 21, a low-pass filter 22, and an amplifier 23, for example. The double-balanced mixer 21 generates two beat signals having mutually different frequencies by mixing together the measurement signal f1(*t*) fed from the oscillator 13 and the VCO signal f2(*t*) (local oscillation signal) fed from the voltage-controlled oscillator 50. Specifically, the double-balanced mixer 21 generates a first beat signal indicated by f1(*t*)+f2(*t*), and a second beat signal indicated by |f1(*t*)−f2(*t*)|. The low-pass filter 22 removes the high-frequency first beat signal and passes only the low-frequency second beat signal. The second beat signal is the signal indicated by |f1(*t*)−f2(*t*)| as described above, and indicates the difference between the frequency of the measurement signal f1(*t*) and the frequency of the VCO signal f2(*t*). The second beat signal thus has a lower frequency than the measurement signal f1(*t*). The output signal of the low-pass filter 22 is amplified by the amplifier 23 and outputted as the converted measurement signal Δf(t). Specifically, the measurement signal f1(*t*) is converted to the low-frequency converted measurement signal Δf(t) by passing through the mixer 20. High-precision signal detection is achieved by this frequency conversion processing in the mixer 20. The converted measurement signal Δf(t) generated by the mixer 20 is fed to the frequency detector 30.

Figure 4:
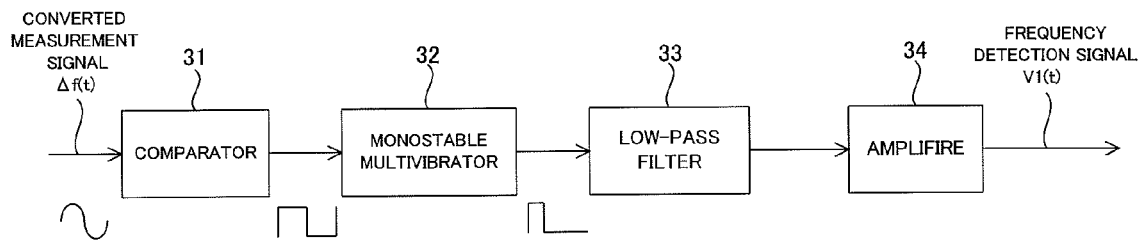
FIG. 4 is a block diagram showing the structure of the frequency detector as an embodiment of the present invention.

FIG. 4 is a block diagram showing the structure of the frequency detector 30 in more detail. The frequency detector 30 is composed of a comparator 31, a monostable multivibrator 32, a low-pass filter 33, and an amplifier 34. The comparator 31 binarizes the converted measurement signal Δf(t) outputted from the mixer 20. Specifically, the comparator 31 compares the converted measurement signal Δf(t) and a predetermined reference level, and outputs a digital signal of 1 when the signal level of Δf(t) is higher than the reference level, and outputs a digital signal of 0 when the signal level of Δf(t) is lower than the reference level. In order to prevent chattering of the output in this binarization determination, appropriate positive feedback may be applied, and a so-called hysteresis characteristic may be imparted. The output signal of the comparator 31 is inputted to the monostable multivibrator 32. The monostable multivibrator 32 generates a series of pulse signals having a constant pulse width with the rising edge of the inputted binarized signal as a trigger, and feeds the pulse signal series to the low-pass filter 33. The low-pass filter 33 averages the pulse train outputted from the monostable multivibrator 32. The pass band of the low-pass filter 33 is set lower than the frequency of the converted measurement signal Δf(t), so that the converted measurement signal Δf(t) is removed as a carrier component. The output of the low-pass filter 33 is amplified by the amplifier 34, outputted as the frequency detection signal V1(*t*), and fed to the controller 40 and synchronous detector 70. In this arrangement, since the monostable multivibrator outputs a fixed-width pulse for each cycle of the input signal, when the cycle of the input signal shortens; i.e., when the frequency of the converted measurement signal Δf(t) increases, the number of fixed-width pulses outputted per unit time increases. Since the pulse train outputted by the monostable multivibrator 32 is averaged by the low-pass filter 33, the output level thereof increases. When the cycle of the input signal increases in length; i.e., when the frequency of the converted measurement signal Δf(t) decreases, the number of fixed-width pulses outputted from the monostable multivibrator 32 per unit time decreases. Therefore, when the pulses are averaged by the low-pass filter 33, the output level thereof decreases. Specifically, the frequency detector 30 outputs a frequency detection signal $V1(t)$ that has a signal level corresponding with the frequency of the input converted measurement signal Δf(t).

Plainly speaking regarding the frequency detection signal $V1(t)$, the variation of the capacitance Cp of the recording medium 10 that occurs due to application of the search signal $f3(t)$ is converted to a frequency by the oscillator 13, converted to a low frequency by the mixer 20, and further f/V converted by the frequency detector 30, and the resultant signal is the frequency detection signal $V1(t)$.

Figure 5:
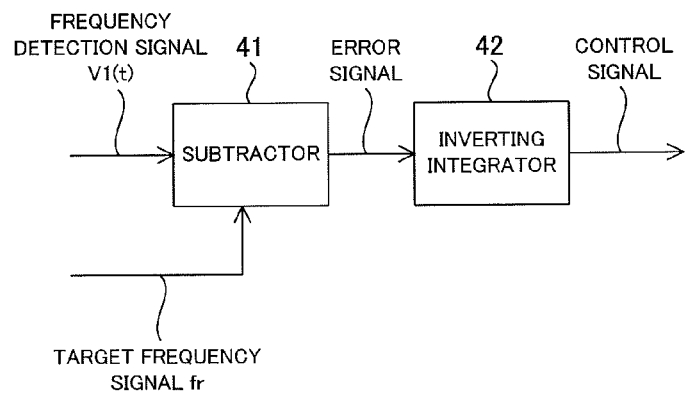
FIG. 5 is a block diagram showing the structure of the controller as an embodiment of the present invention.

FIG. 5 is a block diagram showing the structure of the controller 40 in more detail. The controller 40 is composed of a subtractor 41 and an inverting integrator 42. The frequency detection signal $V1(t)$ is inputted to one input terminal of the subtractor 41, and the target frequency signal fr indicating the target value of the converted measurement signal Δf(t) is inputted to the other input terminal. The subtractor 41 subtracts the frequency detection signal $V1(t)$ from the target frequency signal fr and outputs the result as an error signal. The inverting integrator 42 integrates the error signal, applies phase compensation for the error signal so that the error signal is zero, and outputs a phase-inverted control signal. Specifically, the inverting integrator 42 raises the output level of the control signal when the error signal outputted from the subtractor 41 is negative, and lowers the output level of the control signal when the error signal is positive. The control signal generated by the controller 40 is fed to the voltage-controlled oscillator 50.

The voltage-controlled oscillator 50 includes an inductor, a variable-capacitance diode, and an active element, for example (none of which are shown), and varies the capacitance value of the variable-capacitance diode according to the control signal fed from the controller 40. As a result, the voltage-controlled oscillator 50 outputs a VCO signal $f2(t)$ (local oscillation signal) whose oscillation frequency corresponds with the control signal. In other words, the VCO signal $f2(t)$ is controlled by the controller 40 so that the frequency of the converted measurement signal Δf(t) outputted from the mixer 20 matches the target frequency.

A frequency control loop is thus formed by the mixer 20, frequency detector 30, controller 40, and voltage-controlled oscillator 50 in the physical properties detection device of the present invention. The operation of this frequency control loop will be described hereinafter. By forming the frequency control loop, even when the frequency of the measurement signal $f1(t)$ varies significantly, since the VCO signal $f2(t)$ also varies accordingly with this variation, the converted measurement signal Δf(t) (=|$f1(t)-f2(t)$|) is maintained at the target frequency. More specifically, the capacitance Cp can fluctuate significantly according to the position at which the probe 11 scans the recording medium 10. When the capacitance Cp decreases in response to a change in the reproduction position, and the frequency of the measurement signal $f1(t)$ increases, the converted measurement signal Δf(t) outputted from the mixer 20 increases, and in conjunction with this increase, the signal level of the frequency detection signal $V1(t)$ outputted from the frequency detector 30 increases. When the frequency of the converted measurement signal Δf(t) manifested by the frequency detection signal $V1(t)$ is higher than the target frequency, the error signal outputted from the subtractor 41 has a negative level. When a negative-level error signal is fed to the inverting integrator 42, the signal level of the control signal outputted from the controller 40 increases. When the signal level of the control signal increases, the frequency of the VCO signal $f2(t)$ that is the output of the voltage-controlled oscillator 50 increases. When the frequency of the VCO signal $f2(t)$ increases, the once-increased frequency of the converted measurement signal Δf(t) decreases, and is controlled so as to match the target frequency. Conversely, when the capacitance Cp increases according to the position at which the probe 11 scans the recording medium 10, the frequency of the measurement signal $f1(t)$ accordingly decreases, and the converted measurement signal Δf(t) outputted from the mixer 20 is lower than the target frequency, the frequency of the VCO signal $f2(t)$ is reduced by the operation of the frequency control loop, and the once-reduced frequency of the converted measurement signal Δf(t) increases, and is controlled so as to match the target frequency.

Figure 6:
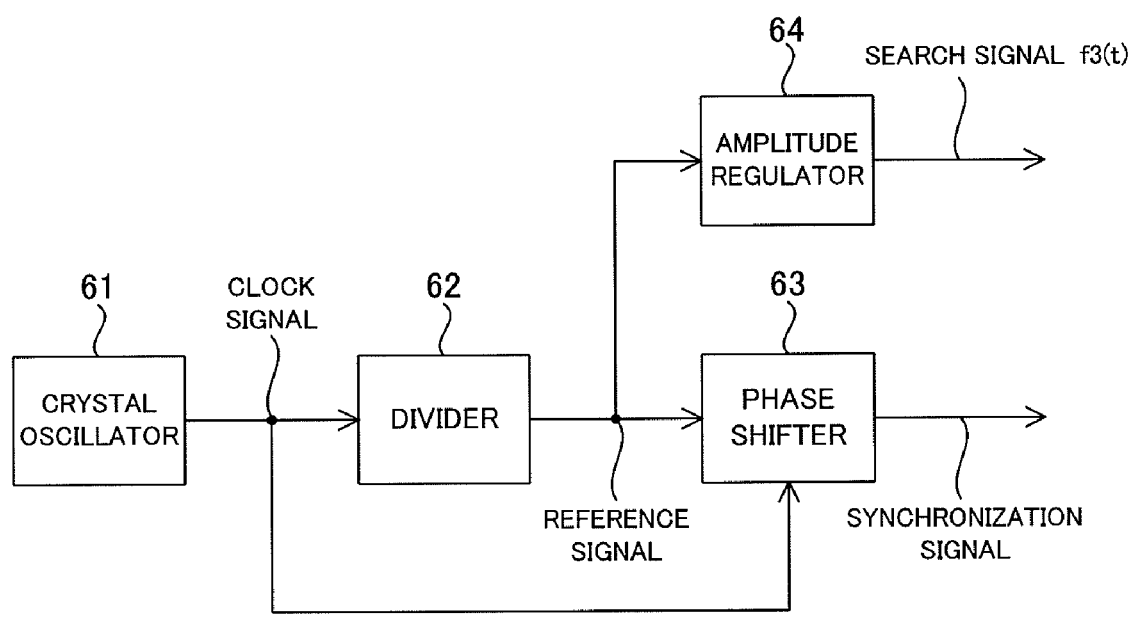
FIG. 6 is a block diagram showing the structure of the search signal generator as an embodiment of the present invention.

The signal detection system will next be described. FIG. 6 is a block diagram showing the structure of the search signal generator 60 in more detail. The search signal generator 60 is composed of a crystal oscillator 61, a divider 62, a phase shifter 63, and an amplitude regulator 64, for example. The crystal oscillator 61 outputs a clock signal at a stable oscillation frequency of, e.g., 10 MHz, and feeds the clock signal to the divider 62 and the phase shifter 63. The divider 62 divides the input clock signal into, e.g., 1/1000, outputs a reference signal having a frequency of 10 KHz, and feeds the reference signal to the amplitude regulator 64 and the phase shifter 63. The amplitude regulator 64 adjusts the amplitude and offset voltage of the reference signal, generates a search signal $f3(t)$ having an amplitude of ±5V and a frequency of 10 KHz, and feeds the search signal $f3(t)$ to the recording medium 10. The level of the search signal $f3(t)$ is adjusted by the operation of the amplitude regulator 64, and an appropriate alternating electric field is applied to the recording medium 10. Specifically, the search signal $f3(t)$ is adjusted to the necessary amplitude level to read the data recorded in the recording medium 10, but not to an amplitude level for writing data. The phase shifter 63 is composed of, e.g., a shift register, and shifts the phase of the reference signal in accordance with the clock signal, the reference signal being fed from the divider 62, and outputs the phase-shifted reference signal as a synchronization signal to the synchronous detector. The synchronization signal is delayed with respect to the search signal $f3(t)$ a time Ts that corresponds to the amount of delay from application of the search signal $f3(t)$ to synchronous detection by the synchronous detector 70 described hereinafter. Synchronous detection by the synchronous detector 70 is thereby performed appropriately. The search signal $f3(t)$ and the synchronization signal may also be fed from outside the physical properties detection device of the present invention.

Figure 7:
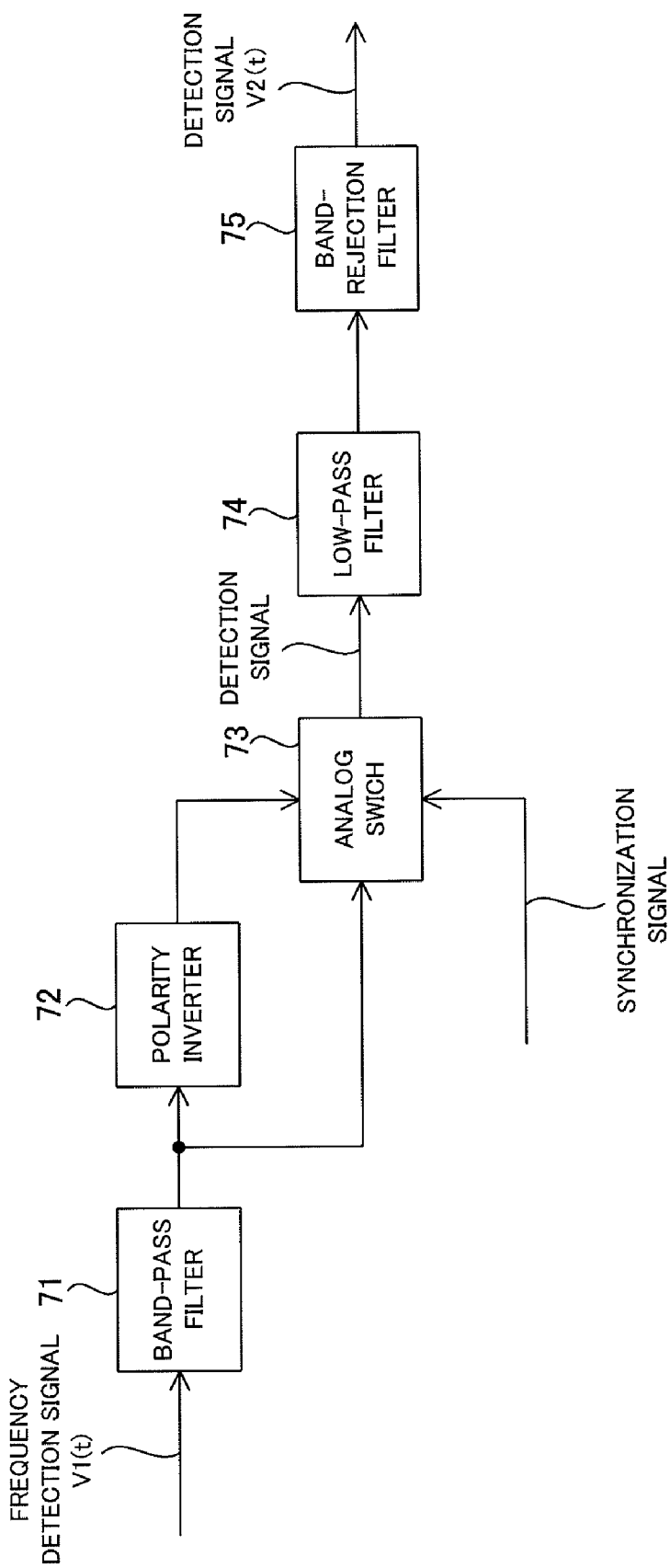
FIG. 7 is a block diagram showing the structure of the synchronous detector as an embodiment of the present invention.

FIG. 7 is a block diagram showing the structure of the synchronous detector 70 in more detail. The synchronous detector 70 is composed of, e.g., a band-pass filter 71, a polarity inverter 72, an analog switch 73, a low-pass filter 74, and a band rejection filter 75. The frequency detection signal $V1(t)$ is fed from the frequency detector 30 to the band-pass filter 71. As described above, the frequency detection signal $V1(t)$ is a signal in which the variation of the oscillation frequency of the oscillator 13 that occurs in response to application of the search signal f3(t) to the recording medium 10 is detected as a voltage. In other words, since the frequency detection signal V1(t) varies essentially in conjunction with the variation of the search signal f3(t), there is no need for components other than the frequency component of the search signal f3(t). Consequently, the band-pass filter 71 is designed to pass only the frequency component of the search signal f3(t) and remove signal components in other bands as noise. Noise can come from such sources as a hum signal from an alternating-current power supply, for example. The frequency detection signal V1(t) from which noise has been removed by the band-pass filter 71 is fed to the polarity inverter 72 and the analog switch 73. The polarity inverter 72 inverts the polarity of the frequency detection signal V1(t) and feeds the inverted signal to the analog switch 73. A signal inverted in polarity by the polarity inverter 72, and a signal that bypasses the polarity inverter 72 and retains the original signal polarity are inputted to the analog switch 73. The synchronization signal outputted from the search signal generator 60 is also inputted to the analog switch 73. With the synchronization signal as a control signal, the analog switch 73 outputs a non-inverted frequency detection signal V1(t), e.g., when the level of the synchronization signal is high, and outputs a polarity-inverted frequency detection signal V1(t) when the level of the synchronization signal is low. The analog switch 73 is composed of a so-called chopper circuit, and is a synchronous detection circuit for detecting only the component of the frequency detection signal V1(t) that is synchronized with the synchronization signal and outputting a detection signal. The low-pass filter 74 and the band rejection filter 75 are carrier removal filters for removing the synchronization signal frequency component included in the detection signal. The low-pass filter 74 is designed to have a pass band that is lower than the frequency of the synchronization signal. The band rejection filter 75 is a so-called notch filter, and is designed so that the rejection frequency thereof matches the frequency of the synchronization signal. By means of the both filters, detection signal V2(t) from which the synchronization signal frequency component included in the detection signal has been removed can be obtained. The filters may also be arranged in the reverse order from that shown in FIG. 7. The band rejection filter 75 may be designed so that the rejection frequencies thereof include the harmonic component of the synchronization signal, the frequency of the synchronization signal and the harmonic component thereof, or a plurality of other frequency bands.

Figure 8:
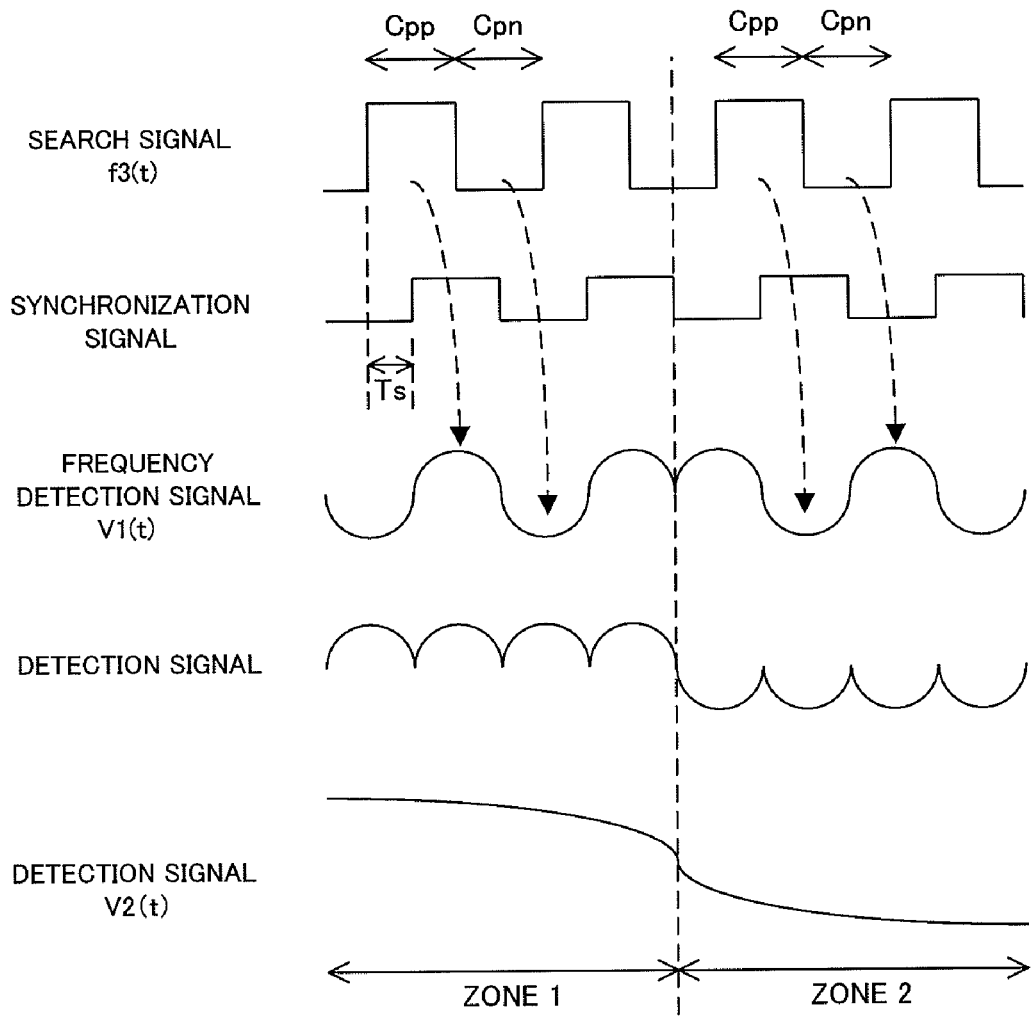
FIG. 8 is a timing chart showing the operation of the physical properties detection device as an embodiment of the present invention.

The operation of the physical properties detection device of the present invention will next be described with reference to the timing chart shown in FIG. 8. Zone 1 and zone 2 in FIG. 8 indicate polarization domains of the recording medium 10, wherein that data "1" is recorded in zone 1, and the data "0" is recorded in zone 2. In other words, mutually different polarization states that each correspond to data are expressed in zone 1 and zone 2 in the recording medium 10. As shown in FIG. 8, the search signal generator 60 applies a search f3(t) whose polarity periodically varies to the recording medium 10 via the metal stage 14. The search signal f3(t) may be a rectangular wave or a sine wave. An alternating electric field is thereby applied to the recording medium 10, and the capacitance Cp directly below the probe 11 interjacent to the recording medium varies. When the search signal f3(t) has a positive polarity, a positive-direction electric field is applied to the recording medium 10, and the electrostatic capacitor directly below the probe 11 at this time is designated as Cpp. When the search signal f3(t) has a negative polarity, a negative-direction electric field is applied to the recording medium 10, and the electrostatic capacitor directly below the probe 11 at this time is designated as Cpn. In zone 1 and zone 2 as described above, the polarization directions of the recording medium 10 are mutually different, and this difference causes the relationship Cpp<Cpn to occur in zone 1, and the relationship Cpp>Cpn to occur in zone 2. Therefore, the measurement signal f1(t) outputted from the oscillator 13 has a higher oscillation frequency in zone 1 when the positive-direction electric field is applied than when the negative-direction electric field is applied. On the other hand, in zone 2, the oscillation frequency is lower when the positive-direction electric field is applied than when the negative-direction electric field is applied. The measurement signal f1(t) is converted to the low-frequency converted measurement signal $\Delta$f(t) by the mixer, but the variation of the oscillation frequency on the basis of application of the alternating electric field is transmitted to the frequency detector 30 without modification.

The frequency detection signal V1(t) outputted from the frequency detector 30 is a signal in which a frequency is converted to a voltage, and is delayed a time Ts with respect to the output time of the search signal f3(t) after passing through the band-pass filter 71. Specifically, as shown in FIG. 8, the frequency detection signal V1(t) is delayed a time Ts with respect to the search signal f3(t), and in zone 1, exhibits a high level in accordance with the application of a positive-direction electric field, and exhibits a low level in accordance with the application of a negative-direction electric field. The frequency detection signal V1(t) exhibits the opposite signal levels in zone 2. The search signal generator 60 generates a synchronization signal that is delayed with respect to the output time of the search signal f3(t) by a time Ts that corresponds to the amount of delay from application of the search signal f3(t) until synchronous detection. The search signal generator 60 feeds the synchronization signal to the synchronous detector 70. As a result, the frequency detection signal V1(t) is in the same phase in zone 1 as the synchronization signal, and is in the opposite phase in zone 2.

With the synchronization signal as a control signal, the analog switch 73 of the synchronous detector 70 outputs a non-inverted frequency detection signal V1(t) when the level of the synchronization signal is high, and outputs a polarity-inverted frequency detection signal V1(t) when the level of the synchronization signal is low. In other words, in zone 1, high-level frequency detection signals V1(t) are outputted without modification, and low-level frequency detection signals V1(t) are inverted and outputted. In zone 2, high-level frequency detection signals V1(t) are inverted and outputted, and low-level frequency detection signals V1(t) are outputted without modification. The detection signal obtained through this signal processing is composed of only a positive-polarity signal in zone 1, and composed of only a negative-polarity signal in zone 2, as shown in FIG. 8. Through the operation of the low-pass filter 74 and band rejection filter 75, the carrier component is removed from the detection signal, and the detection signal V2(t) is generated. The detection signal V2(t) is positive in zone 1 and negative in zone 2. In other words, the data "1" and "0" recorded in the recording medium 10 are detected as differences in voltage level and reproduced purely electrically. In other words, the polarization state of the ferroelectric material is detected by a purely electrical method.

The frequency setting of the various signals generated by the components described above will next be described.

Figure 9:
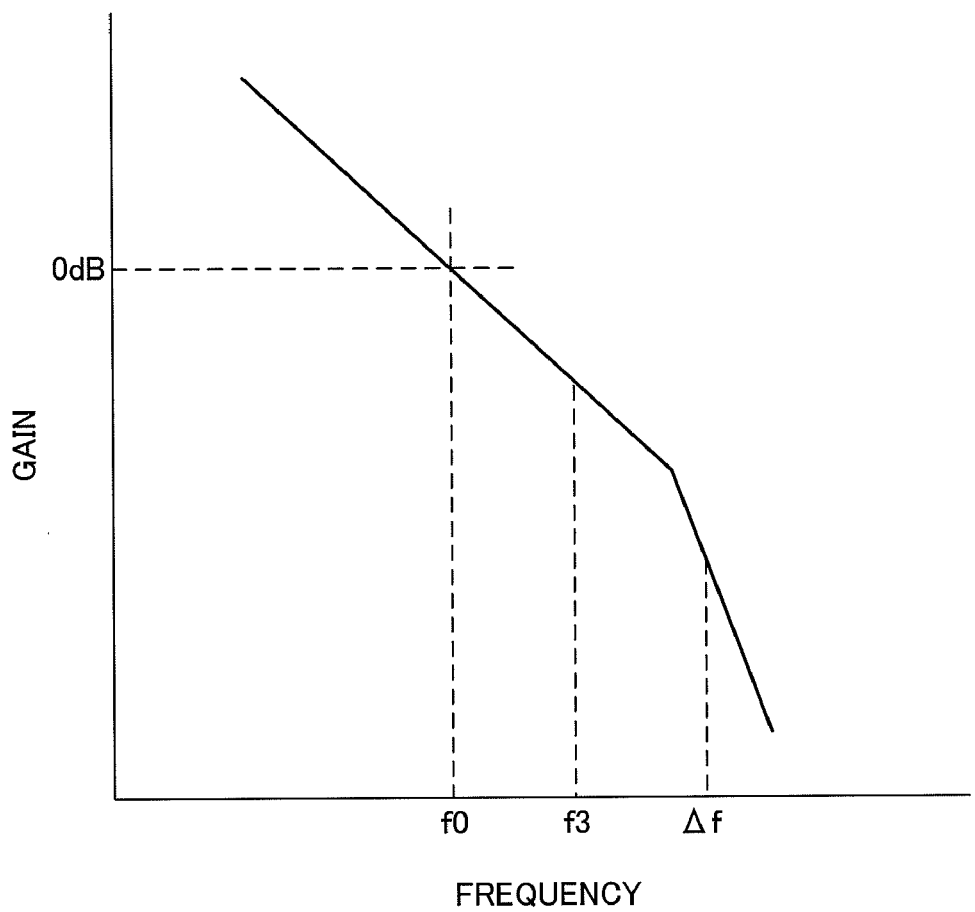
FIG. 9 is a graph showing the open loop characteristics of the frequency control system.

FIG. 9 is a Bode plot showing the open-loop characteristics of the frequency control system. In FIG. 9, f0 is the gain crossover frequency, f3 is the search signal frequency (frequency of the alternating electric field; frequency of the synchronization signal), and $\Delta$f is the frequency of the converted measurement signal (intermediate frequency), and these frequencies are preferably set so that f0<f3<Δf, for the reasons described below.

If the frequencies were to be set so that f0>f3, a frequency servo would track the search signal frequency f3, and the amount of variation of the frequency detection signal V1($t$) with respect to the search signal would decrease, resulting in a lower detection S/N ratio of the detection signal V2($t$).

As described above, the pass band of the low band-pass filter 33 of the frequency detector 30 is set lower than the frequency Δf of the converted measurement signal Δf(t) so that the converted measurement signal Δf(t) is removed as a carrier component. The signal band of the frequency detection signal V1($t$) inputted to the synchronous detector 70 is therefore equal to or lower than Δf. Accordingly, if f3 were to be set so as to be greater than Δf, the relation f3>Δf>V1($t$) would occur. In the synchronous detection processing performed by the synchronous detector 70, if the synchronous signal frequency (=f3) were high in comparison to the signal band of the frequency detection signal V1($t$), which is the input signal to be detected, a band other than that of the input signal would be synchronously detected, and the sensitivity of detection would decrease. The detection S/N ratio of the detection signal V2($t$) would decrease as a result. For this reason, by setting each frequency so that f0<f3<Δf, the S/N ratio of the detection signal V2($t$) that is the ultimate result of detection is enhanced, and the data can be accurately reproduced.

Figure 10:
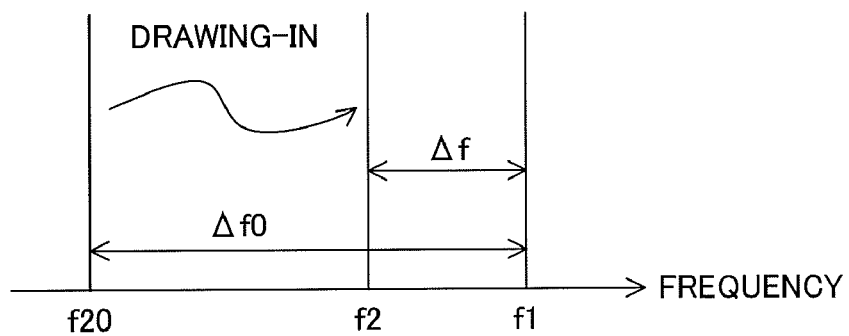
FIG. 10 is a view showing the frequency settings of the input/output signals of the mixer.

The frequency settings of the input/output signals of the mixer 20 will next be described with reference to FIG. 10. In FIG. 10, f1 is the measurement signal frequency (output frequency of the oscillator 13), f2 is the VCO signal frequency, f20 is the VCO signal frequency at the time of servo initialization, and Δf is the converted measurement signal frequency (intermediate frequency). In this case, when the controller 40 is designed so that the relation f1>f2 is always in effect, the initial frequency f20 of the VCO signal is preferably set so that f20<f2<f1. The reasons for adopting this configuration are described below, using as an example the problems that would occur if the frequencies were set so that f20>f1.

Feedback control in the frequency control loop is initialized when the power supply of the device is activated. Specifically, the accumulated charge of a condenser (not shown) of the inverting integrator 42 of the controller 40 is set to an initial value, and the frequency control loop is thereby initialized. As a result, the output level of the control signal, which is the input signal of the voltage-controlled oscillator 50, attains an initial value. When the level of the control signal is at the initial value, the frequency of the VCO signal f2($t$), which is the output signal of the voltage-controlled oscillator 50, is f20. The converted measurement signal Δf(t) is then outputted from the mixer 20, and the frequency thereof is Δf0 (=|f1−f20|). When the frequency Δf in this case is higher than the target frequency, the error signal outputted from the subtractor 41 of the controller 40 is negative, and the signal level of the control signal that is the output of the inverting integrator 42 therefore increases. When the signal level of the control signal increases, the frequency f2 of the VCO signal f2($t$) outputted from the voltage-controlled oscillator 50 increases. When the frequency f2 of the VCO signal f2($t$) increases, the difference in frequency between f1 and f2 is even larger, the frequency Δf of the converted measurement signal Δf(t) increases, the mismatch from the target frequency further increases, the control loop becomes a positive feedback loop, and frequency control oscillates. For this reason, the frequency control loop is locked, and when the polarity of the controller 40 is selected so that f1>f2 when feedback control is stable, setting the frequencies in the sequence f20<f2<f1 makes it possible to prevent positive feedback from occurring in the frequency control loop, and to stabilize the drawing-in process of frequency control.

As is clear from the above description, the physical properties detection device of the present invention converts the measurement signal f1($t$) to the low-frequency converted measurement signal Δf(t). The extremely minute variation of the frequency of the measurement signal f1($t$) that accompanies application of the alternating electric field can thereby be precisely detected. A lower frequency must be selected for Δf(t) in order to detect this frequency variation with higher precision. When the frequency of the measurement signal f1($t$) outputted from the oscillator 13 is set to 1 GHz, for example, the variation in the capacitance Cp that accompanies application of the alternating electric field is on the aF order, as described above, and the frequency variation of the measurement signal f1($t$) caused by this capacitance variation is therefore 1 KHz or less. A frequency of several hundred KHz must be selected for the converted measurement signal Δf(t) in order to precisely detect a frequency variation of 1 KHz or less caused by a 1 GHz signal. This conversion of the frequency of the measurement signal f1($t$) is achieved by the mixer 20 and the VCO signal f2($t$).

In the physical properties detection device of the present invention, a frequency control loop is formed by the mixer 20, frequency detector 30, controller 40, and voltage-controlled oscillator 50, and feedback control is performed so that the converted measurement signal Δf(t) having an intermediate frequency matches the target frequency. Therefore, even when the capacitance Cp fluctuates significantly as the probe 11 moves over the recording medium 10, and accompanying the fluctuation of capacitance Cp, frequency of the measurement signal f1($t$) fluctuates, since control is performed so that the VCO signal f2($t$) varies in conformity with this fluctuation, and the controlled measurement signal Δf(t) is constant, it is possible to remove the frequency fluctuation component that occurs due to such factors as variation of the data reproduction position, and signals can be detected with high precision. More specifically, when the oscillation frequency of the measurement signal f1($t$) is 1 GHz, the frequency variation of the measurement signal f1($t$) that accompanies changes in the data reproduction position can reach 1 MHz or more. In a case in which a frequency of several hundred KHz is selected for the converted measurement signal Δf(t) (=|f1($t$)−f2($t$)|) outputted from the mixer 20, if the frequency of the VCO signal were to be set to a fixed value without the use of feedback control, the amount of variation of the measurement signal f1($t$) that accompanies a change in the reproduction position of the recording medium would exceed the frequency of the converted measurement signal Δf(t), and frequency detection would fail. Therefore, in the present invention, a frequency control loop is formed by the mixer 20, frequency detector 30, controller 40, and voltage-controlled oscillator 50, and the VCO signal f2($t$) is controlled so as to follow the frequency deviance of the measurement signal f1($t$) so that the converted measurement signal Δf(t) is constant. Causes of frequency fluctuation other than the frequency variation based on application of the alternating electric field can therefore be eliminated, and signals can be detected with high precision.

In comparison to the conventional method of synchronous detection using a lock-in amplifier, the physical properties detection circuit of the present invention is also capable of reproducing data at a higher speed, and the physical properties detection device can be formed by a small-scale circuit, thus enabling smaller size and a higher degree of integration.

Second Embodiment

A second embodiment of the physical properties detection device of the present invention will next be described. The configuration of the controller 40 shown in FIG. 5 in the first embodiment described above can be applied when the relation f1>f2 is always true regarding the relationship between the frequency f1 of the measurement signal f1(t) and the frequency f2 of the VCO signal f2(t). In contrast, the configuration of the second embodiment can be applied when the relation f1<f2 is always true.

Figure 11:
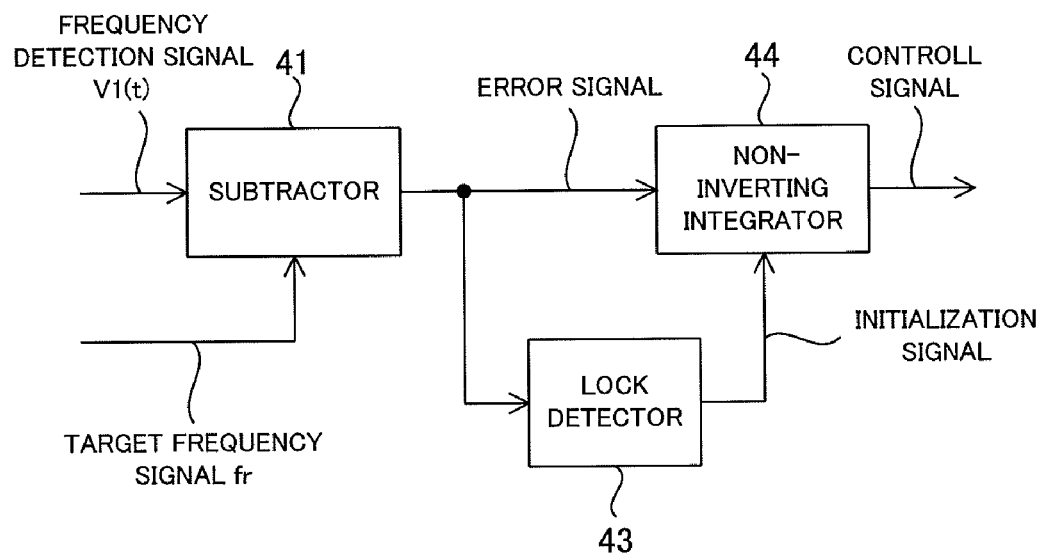
FIG. 11 is a block diagram showing the structure of the controller according to a second embodiment of the present invention.

FIG. 11 is a block diagram showing the specific structure of the controller 40' of the second embodiment. The controller 40' is composed of a subtractor 41, a lock detector 43, and a non-inverting integrator 44. The subtractor 41 subtracts a frequency detection signal from a target frequency signal fr and outputs the result as an error signal. The non-inverting integrator 44 integrates the error signal and outputs a control signal without inverting the phase of the error signal, so that the error signal is zero. Specifically, the non-inverting integrator 44 lowers the output level of the control signal when the error signal outputted from the subtractor 41 is negative, and raises the output level of the control signal when the error signal is positive. The non-inverting integrator 44 thus adjusts the output level of the control signal according to the error signal, and the polarity of the control signal is the opposite of that of the inverting integrator 42 of the first embodiment.

The lock detector 43 is composed of a comparator or other level comparator (not shown), and a sequencer (not shown) that includes a counter or other time interval counter, for example. The lock detector 43 monitors the frequency control state, and outputs an initialization signal and initializes the non-inverting integrator 44 of the subsequent part when a determination is made that a lock is not in effect continuously. Specifically, the lock detector 43 outputs an initialization signal when the error signal outputted from the subtractor 41 exceeds a predetermined range, or at the time the power supply of the device is activated. The lock detector 43 may also be configured so as to generate an initialization signal when a state in which the error signal outputted from the subtractor 41 exceeds a predetermined range has continued for a certain amount of time.

When the non-inverting integrator 44 receives the initialization signal, the accumulated charge of an internal condenser (not shown) is set to an initial value, and the control signal is set to an initial value. When the control signal is set to the initial value, the VCO signal f2(t) outputted from the voltage-controlled oscillator 50 is initialized, and feedback control in the feedback control loop is initialized. The drawing-in operation of the frequency control loop can thereby be stabilized. The relation f1>f2 is also in effect, and even when oscillation due to positive feedback occurs, since the drawing-in operation of the frequency control loop is automatically started by the initialization operation, a state of positive feedback can be prevented from continuing. The components of the second embodiment other than the controller are the same as in the first embodiment, and therefore will not be described.

Figure 12:
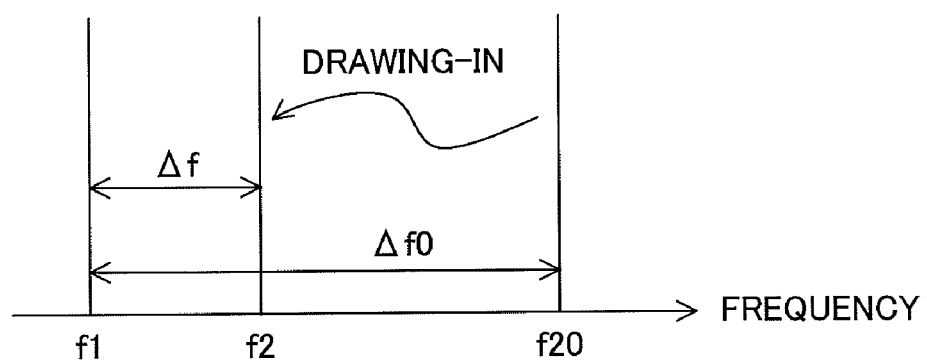
FIG. 12 is a view showing the frequency settings of the input/output signals of the mixer.

The frequency settings of the input/output signals of the mixer 20 in the present embodiment will next be described with reference to FIG. 12. In FIG. 12, f1 is the measurement signal frequency (output frequency of the oscillator 13), f2 is the VCO signal frequency, f20 is the VCO signal frequency at the time of servo initialization, and Δf is the converted measurement signal frequency (intermediate frequency). When the controller 40 is designed so that the relation f1<f2 is always in effect, the initial frequency f20 of the VCO signal is preferably set so that f20>f2>f1. The reasons for adopting this configuration are described below, using as an example the problems that would occur if the frequencies were set so that f20<f1.

Feedback control in the frequency control loop is initialized when the power supply of the device is activated. Specifically, the accumulated charge of a condenser (not shown) of the non-inverting integrator 44 of the controller 40' is set to an initial value, and the frequency control loop is thereby initialized. As a result, the output level of the control signal, which is the input signal of the voltage-controlled oscillator 50, attains an initial value. When the level of the control signal is at the initial value, the frequency of the VCO signal f2(t), which is the output signal of the voltage-controlled oscillator 50, is f20. The converted measurement signal Δf(t) is then outputted from the mixer 20, and the frequency thereof is Δf0 (=|f1−f20|) When the frequency Δf is higher than the target frequency, the error signal outputted from the subtractor 41 of the controller 40' is negative, and the signal level of the control signal that is the output of the non-inverting integrator 44 therefore decreases. When the signal level of the control signal decreases, the frequency f2 of the VCO signal f2(t) outputted from the voltage-controlled oscillator 50 decreases. When the frequency f2 of the VCO signal f2(t) decreases, the difference in frequency between f1 and f2 is even larger, the frequency Δf of the converted measurement signal Δf(t) increases, the mismatch from the target frequency further increases, the control loop becomes a positive feedback loop, and frequency control oscillates. For this reason, the frequency control loop is locked, and when the polarity of the controller 40' is selected so that f1<f2 when feedback control is stable, setting the frequencies in the sequence f20>f2>f1 makes it possible to prevent positive feedback from occurring in the frequency control loop, and to stabilize the drawing-in process of frequency control.

In the physical properties detection device of the present invention, the controller can be configured either as shown in FIG. 5, or as shown in FIG. 11, based on the fact that the frequency Δf (=|f1(t)−f2(t)|) of the converted measurement signal Δf(t) to be controlled is outputted as an absolute value. A configuration may also be adopted in which both types of controllers 40 and 40' are provided, and one of the controllers is selected for use according to the frequency characteristics of the measurement signal f1(t), for example.

Third Embodiment

Figure 13:
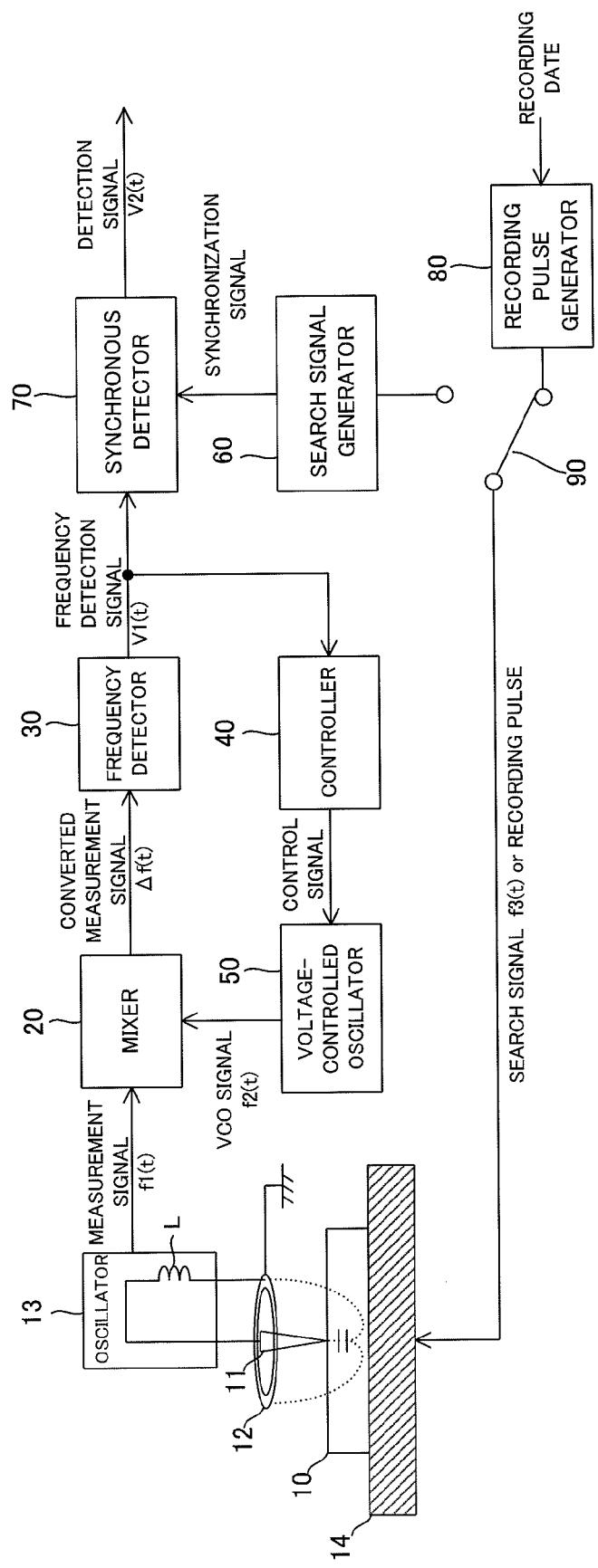
FIG. 13 is a block diagram showing the overall structure of the physical properties detection device as another embodiment of the present invention.

A third embodiment of the physical properties detection device of the present invention will next be described. FIG. 13 is a block diagram showing the structure of the physical properties detection device according to the third embodiment of the present invention. The device of the third embodiment is a recording/reproduction device that comprises a recording pulse generator 80 and a changeover switch 90 in addition to the structure of the first embodiment shown in FIG. 2. The recording pulse generator 80 generates a recording pulse that corresponds to data to be recorded in the recording medium 10. The recording pulse may be a sine wave or a rectangular wave, but must have a voltage level sufficient to enable data to be written to the recording medium 10. The changeover switch 90 is connected to the recording pulse generator 80 during recording of data in the recording medium 10, and the changeover switch 90 is connected to the search signal generator 60 during reproducing of data. When a recording pulse is applied to the recording medium 10 from the recording pulse generator 80 via the metal stage 14, an electric field stronger than the coercive field is applied to recording medium 10 at the position directly below the probe 11, and the position is polarized in the direction that corresponds to the direction of the applied electric field. This polarization direction corresponds to data, and data is thereby recorded. During reproducing date, the changeover switch 90 is connected to the search signal generator 60, and the search signal f3(t) is applied to the recording medium 10, whereby the polarization direction is detected, and the data is reproduced. The search signal generator 60 and the recording pulse generator 80 are not necessarily independent of each other, and may also be configured as a single oscillator that is capable of varying an output level or other characteristic differently corresponds to recording and reproducing.

Fourth Embodiment

Figure 14:
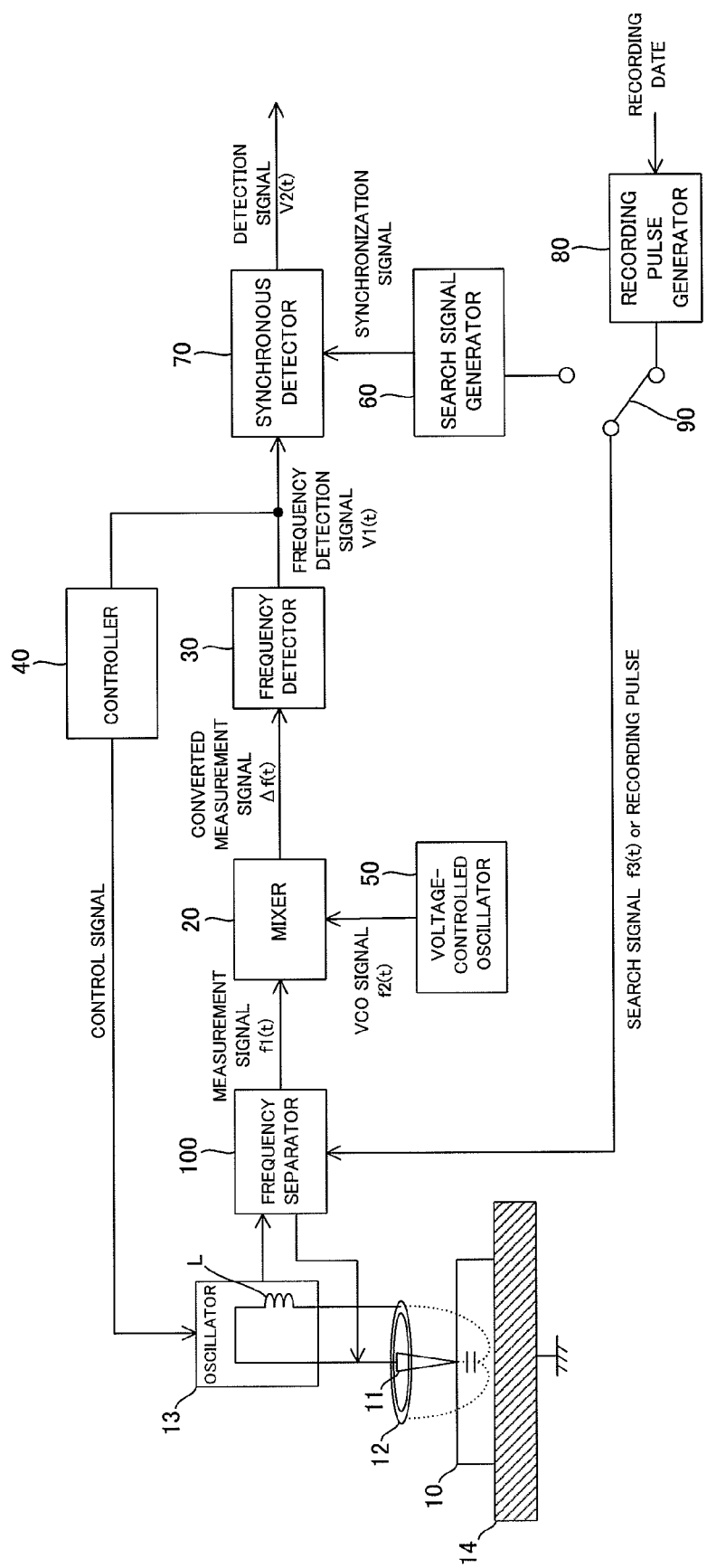
FIG. 14 is a block diagram showing the overall structure of the physical properties detection device as another embodiment of the present invention.

In the first through third embodiments, a configuration was described in which data was recorded and reproduced using a single probe 11. By adopting the configuration shown in FIG. 14, data can be recorded in and reproduced from a recording medium simultaneously using a plurality of probes. In the physical properties detection device of the fourth embodiment, the metal stage 14 is fixed to the ground potential, and a frequency separator 100 is further provided. The control signal outputted from the controller 40 is fed to the oscillator 13, and the output frequency thereof; i.e., the frequency of the measurement signal f1(t), varies in accordance with the control signal. The search signal f3(t) outputted from the search signal generator 60 is fed to the frequency separator 100. The frequency separator 100 receives the search signal f3(t) having a low frequency of, e.g., 10 MHz or lower, feeds the search signal f3(t) to the probe 11, receives the measurement signal f1(t) that is a high-frequency signal of, e.g., 1 GHz or higher, outputted from the oscillator 13, and feeds the measurement signal f1(t) to the mixer 20. The measurement signal f1(t) that has passed through the frequency separator 10 is fed to the mixer 20 and outputted as the converted measurement signal $\Delta f(t)$ (=|f1(t)−f2|). In the present embodiment, the frequency f2 of the VCO signal fed from the voltage-controlled oscillator 50 has a fixed value. The converted measurement signal $\Delta f(t)$ is converted to a voltage by the frequency detector 30 and outputted as the frequency detection signal V1(t). The controller 40 generates a control signal so that the frequency of the converted measurement signal $\Delta f(t)$ as indicated by the frequency detection signal V1(t) matches a target frequency, and the controller 40 feeds the control signal to the oscillator 13. The oscillator 13 varies the frequency of the measurement signal f1(t) in accordance with the control signal so that $\Delta f(t)$ and the target frequency match. The oscillation frequency of the oscillator 13 may be controlled by configuring the oscillator 13 as a voltage-controlled oscillator (VCO), for example.

Since the potential of the recording medium is thus fixed, and the search signal is fed via the probe in the present embodiment, a plurality of probes can be used to simultaneously record and reproduce data. The frequency of the VCO signal f2(t) outputted from the voltage-controlled oscillator 50 is also fixed, the oscillation frequency of the oscillator 13 is feedback-controlled, and the converted measurement signal $\Delta f(t)$ is controlled so as to be constant. Even when data is recorded and reproduced at the same time by using a plurality of probes, it is possible to use one voltage-controlled oscillator 50 in common rather than providing a voltage-controlled oscillator 50 for each probe, and the device can also be simplified and reduced in size. During recording, a recording pulse is fed from the recording pulse generator 80 to each of the plurality of probes, and data are recorded simultaneously in the recording medium 10 by the plurality of probes. Data are thus recorded and reproduced simultaneously using a plurality of probes in the physical properties detection device of the present embodiment, and data can therefore be recorded and reproduced at high speed.

In the embodiments described above, examples were described in which the physical properties detection device of the present invention was applied as a reproduction device or recording/reproduction device using a ferroelectric material as the recording medium. However, the present invention can also be applied to an analysis device for high-resolution monitoring and measurement of the domain structure or non-linear permittivity distribution of the surface of a ferroelectric material.

The invention claimed is:

1. A physical properties detection device comprising:
a probe to be placed near or touching a surface of a ferroelectric;
an oscillation loop including said probe and an capacitance within said ferroelectric; and
a detection part for detecting a physical properties of said ferroelectric on the basis of a frequency variation of a measurement signal generated in said oscillation loop, the frequency variation accompanying application of an alternating electric field to said ferroelectric; said physical properties detection device further comprising:
a frequency conversion part for converting the frequency of said measurement signal to a low frequency and outputting the resulting signal as a converted measurement signal;
a frequency control part for controlling the frequency of said converted measurement signal so as to match a target frequency;
a frequency detection part for generating a frequency detection signal that has a signal level corresponding to the frequency of said converted measurement signal; and
a synchronous detection part for synchronously detecting said frequency detection signal on the basis of a synchronization signal.

2. The physical properties detection device of claim 1, further comprising:
an alternating electric field application part for feeding a search signal having a constant frequency to said ferroelectric and applying an alternating electric field to said ferroelectric; and
a synchronization signal generation part for generating said synchronization signal; wherein
said synchronization signal is delayed a predetermined time with respect to said search signal.

3. The physical properties detection device of claim 2, wherein said synchronous detection part comprises:
a band-pass filter for passing only said frequency detection signals having the same frequency band as the frequency band of said search signal;
a polarity inverter for inverting the polarity of the frequency detection signal that has passed through said band-pass filter;
a synchronous detection circuit for selecting according to said synchronization signal the frequency detection signal that has passed through said band-bass filter, or the frequency detection signal that has been inverted by said polarity inverter, and outputting the selected signal as a detection signal; and a low-pass filter for removing the frequency component of said synchronization signal from said detection signal.

4. The physical properties detection device of claim 2, further comprising:
a recording pulse generator for generating a recording pulse to generate an electric field stronger than the coercive field of said ferroelectric; and
switching part for selectively applying any of said search signal or said recording pulse to said ferroelectric.

5. The physical properties detection device of claim 1, wherein
said frequency control part comprises a controller for generating a control signal on the basis of a frequency difference between said target frequency and said converted measurement signal; and
said frequency conversion part comprises a voltage controlled oscillator for generating a VCO signal at a frequency corresponding with said control signal, and a mixer for mixing said measurement signal and said VCO signal.

6. The physical properties detection device of claim 5, wherein said controller comprises:
a subtractor for subtracting the frequency of said converted measurement signal from said target frequency and outputting the result as an error signal; and
an integrator for integrating said error signal and generating said control signal so that the frequency of said converted measurement signal matches said target frequency.

7. The physical properties detection device of claim 6, wherein
said controller further comprises a lock detector for generating an initialization signal at startup or when said error signal exceeds a predetermined range; and
said integrator sets said control signal to an initial state in accordance with said initialization signal.

8. The physical properties detection device of claim 5, wherein the relationship below is always in effect:

$$f0 < f3 < \Delta f$$

wherein f0 is the gain crossover frequency of a frequency control loop comprising said mixer, said frequency detection part, said controller, and said control oscillator; f3 is the frequency of said search signal; and Δf is the frequency of said converted measurement signal.

9. The physical properties detection device of claim 8, satisfying any of the relationships below:

$$f20 < f2 < f1 \text{ and } f1-f2 = \Delta f > 0; \text{ or}$$

$$f20 > f2 > f1 \text{ and } f2-f1 = \Delta f > 0$$

wherein f1 is the frequency of said measurement signal; f20 is the initial frequency of said VCO signal; f2 is the frequency of the VCO signal when said frequency control loop is locked; and Δf is the frequency of said converted measurement signal.

10. The physical properties detection device of claim 1, wherein said frequency detection part comprises:
a binarization circuit for binarizing said converted measurement signal on the basis of a predetermined reference level;
an oscillation circuit for generating a pulse train having a constant pulse width using an edge of said binarized signal as a trigger signal; and
an averaging circuit for averaging the signal levels of said pulse train.

11. The physical properties detection device of claim 1, wherein
said probe scans over said ferroelectric by changing a relative position in relation to said ferroelectric
said frequency control part controls the frequency of said converted measurement signal in accordance with the frequency variation of said measurement signal based on the scanning position of said probe.

12. The physical properties detection device of claim 11, wherein the frequency variation of said measurement signal based on the variation of scanning position of said probe is more significant than the frequency variation of said measurement signal accompanying application of an alternating electric field.

13. A physical properties detection method for detecting the physical properties of a ferroelectric on the basis of a frequency variation of a measurement signal generated within an oscillation loop including an capacitance within said ferroelectric, and a probe to be placed near or touching a surface of said ferroelectric, the frequency variation accompanying application of an alternating electric field to said ferroelectric; said physical properties detection method comprising:
a frequency conversion step of converting the frequency of said measurement signal to a low frequency and obtaining a converted measurement signal;
a frequency detection step of obtaining a frequency detection signal that has a signal level corresponding to the frequency of said converted measurement signal; and
a synchronous detection step of synchronously detecting said frequency detection signal on the basis of a synchronization signal; wherein
said frequency conversion step includes a frequency control step of controlling the frequency of said converted measurement signal so as to match a target frequency.

14. The physical properties detection method of claim 13, wherein said frequency conversion step includes a step of mixing said measurement signal and a local oscillation signal; and
said control step includes a step of controlling the frequency of said local oscillation signal on the basis of the difference between said target frequency and the frequency of said converted measurement signal.

* * * * *